No. 873,117. PATENTED DEC. 10, 1907.
J. B. BRENDT & C. O. SHERMAN.
ANIMAL TRAP.
APPLICATION FILED APR. 23, 1907.
3 SHEETS—SHEET 1.
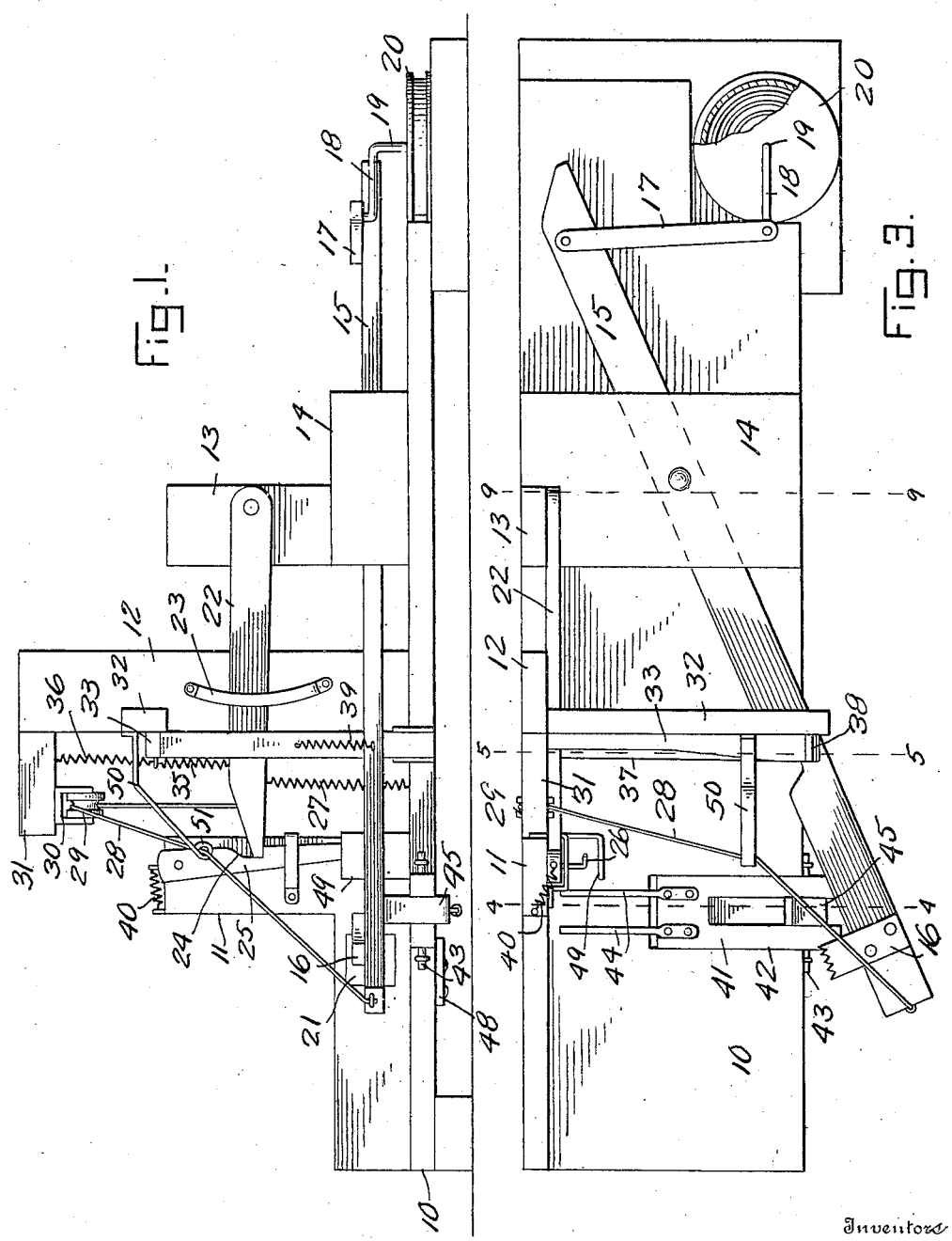
Witnesses
G. R. Thomas
Inventors
Jacob B. Brendt
Charles O. Sherman
By
Attorneys No. 873,117. PATENTED DEC. 10, 1907.
J. B. BRENDT & C. O. SHERMAN.
ANIMAL TRAP.
APPLICATION FILED APR. 23, 1907.
3 SHEETS—SHEET 2.
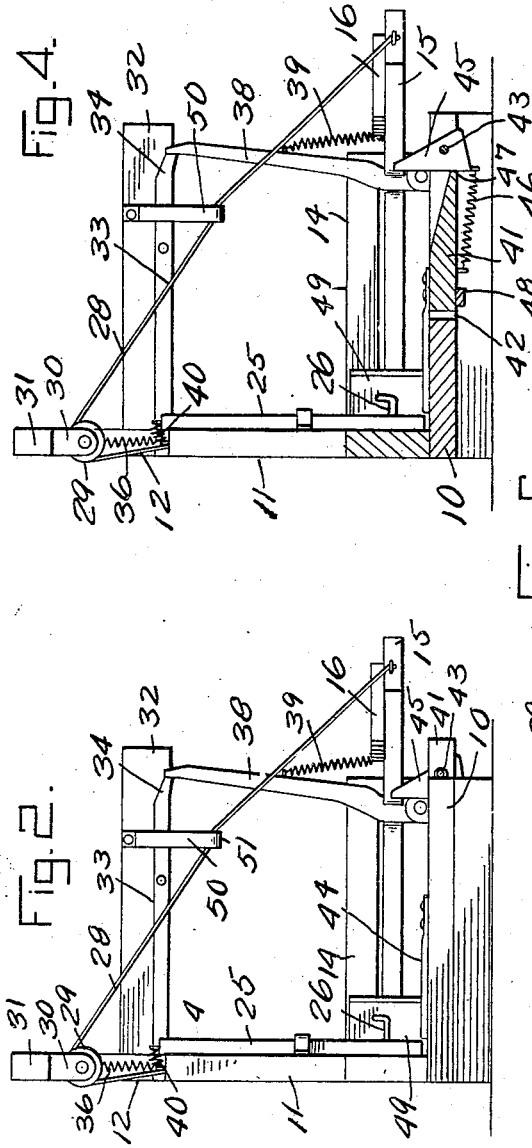
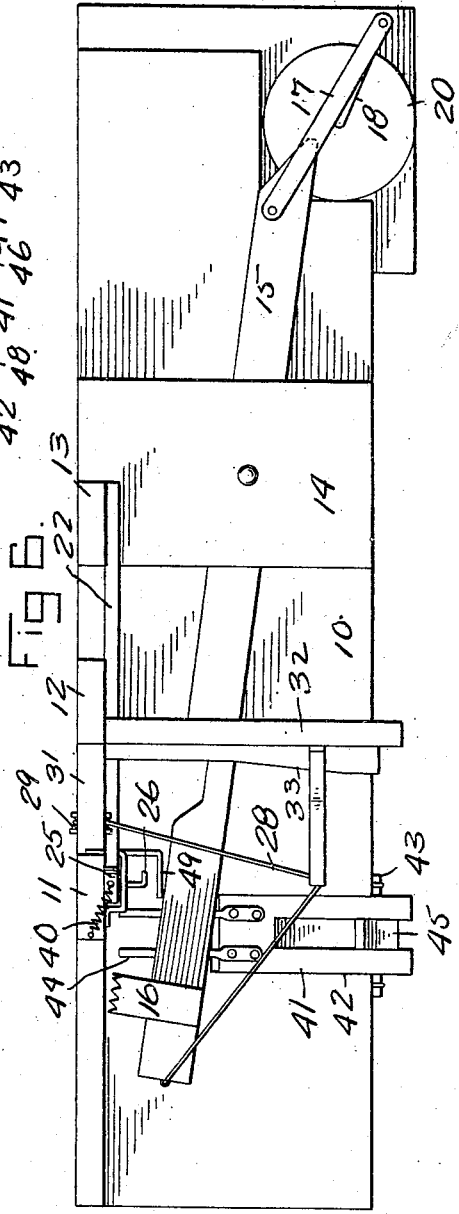
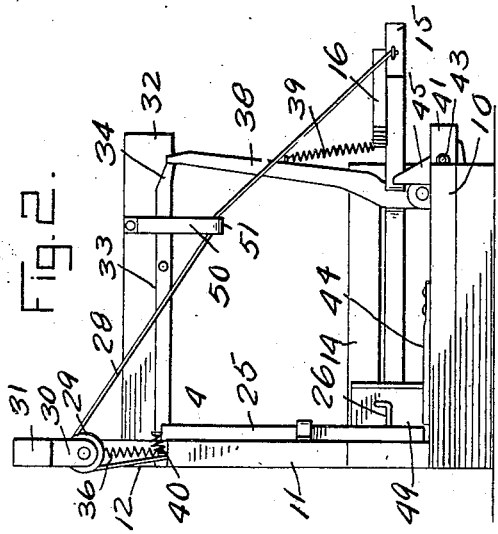
Witnesses
Inventors
Jacob B. Brendt
Charles O. Sherman
By
Attorneys

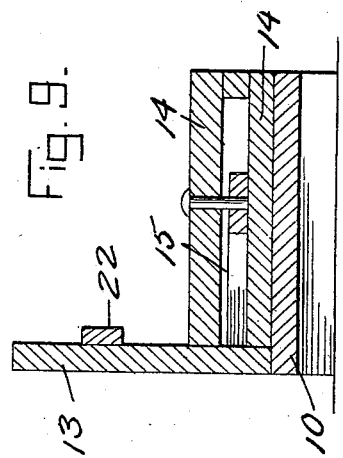

UNITED STATES PATENT OFFICE.

JACOB B. BRENDT AND CHARLES O. SHERMAN, OF POLLOCK, SOUTH DAKOTA.

ANIMAL-TRAP.

No. 873,117.  Specification of Letters Patent.  Patented Dec. 10, 1907.

Application filed April 23, 1907. Serial No. 369,725.

*To all whom it may concern:*

Be it known that we, JACOB B. BRENDT and CHARLES O. SHERMAN, citizens of the United States, residing at Pollock, in the county of Campbell, State of South Dakota, have invented certain new and useful Improvements in Animal-Traps; and we do hereby declare the following to be a full, clear, and exact description of the invention, such as will enable others skilled in the art to which it appertains to make and use the same.

The present invention relates to animal traps, and more particularly to that class of traps having a movable striking claw, and it aims to provide an improved device of that class in which the claw is movable in a horizontal plane with sufficient force to insure death of the animal and its removal from the vicinity of the trap, which shall reset itself again and again, and in which the operation is simple and the construction durable.

The invention will be readily understood from a consideration of the following detailed description, and its preferred embodiment is illustrated in the accompanying drawings, in which like parts are designated by corresponding reference numerals in the several views.

Of the said drawings—Figure 1 is a front elevation of a trap constructed in accordance with the present invention. Fig. 2 is an end view thereof. Fig. 3 is a top plan view.
Figs. 4 and 5 are vertical sections taken transversely on the lines 4—4 and 5—5, respectively, of Fig. 3. Fig. 6 is a plan view illustrating the position of the parts when the trap is sprung. Fig. 7 is a detail view of the latch which carries the bait. Fig. 8 is a detail view of the body-removing mechanism. Fig. 9 is a transverse section on the line 9—9 of Fig. 3.

Referring more particularly to the drawings, 10 designates the base-plate of the trap, at one side of which are mounted the uprights 11, 12 and 13. The rear upright 13 is disposed adjacent a pair of horizontal blocks 14, spaced apart from each other and arranged transversely of the base-plate. Pivoted intermediate its ends and movable between said blocks is an oscillatory rod 15, which carries at its front end a toothed knife plate 16, and is connected at its rear end by a pitman 17 with the crank portion 18 of a shaft 19 of a spring motor 20, which latter is arranged within a seat formed at the rear end of the base-plate. It is to be understood, however, that an ordinary helical spring may be substituted for the spring motor. The motor, when started, will cause the rod 15, which, with its knife-plate, forms the claw of the trap, to oscillate in a horizontal plane across the upper face of the base-plate, the upright 11 being provided with a cutter-plate 21 of relatively soft material to prevent injury to the teeth of the claw in the event of contact therewith.

The rear upright 13 is further provided with a forwardly-extending normally horizontal trip lever 22, pivoted at its rear end thereto and extending through a guide strap 23 carried by the intermediate upright 12, the front end of said lever being engaged in a notch 24 formed on the rear face of an ordinary latch 25, pivoted at its upper end to the front upright 11 and provided at its lower end with a bait-hook 26.

The trip lever 22 is normally pressed toward the base-plate by a retractile spring 27, which is connected at opposite ends to the base-plate and the front end of said lever, and the latter is further connected at such point with one end of a cable 28, the opposite end of which is fastened to the front end of the claw. Between such points, the cable, above referred to, passes around a pulley 29, disposed in a depending bracket 30 carried by a cross-bar 31, which is in turn secured to the upper end of the upright 12.

The upright last mentioned is further provided with a horizontal beam 32, which extends transversely of the base-plate above the trip lever 22, said beam having pivoted thereto a second trip lever 33, which is movable across the front face thereof and is provided with a downwardly beveled front end 34. At its outer end the beam 32 carries a forwardly-projecting metal strap 50, at the free end of which an eye 51 is formed, through which the cable 28 passes. The opposite end of the trip lever 33 is connected by a coil-spring 35 with the trip lever 22, and such end is held normally elevated by means of a second coil-spring 36, the opposite end of which is secured to the crosspiece 31.

Formed transversely in the base-plate is a slot 37 which at one end extends therethrough. At such point is pivoted to the base-plate a third trip lever 38, which, in its normal position, extends vertically from the base-plate, and its free end is engaged by the downwardly beveled end 34 of the trip lever 33. The lever 38 therefore serves to retain the striking claw in its set or operative position, and to this end is connected therewith by a coil-spring 39. The hook end of the latch 25 is normally forced rearwardly of the trap by means of a spring 40, which is connected to the upper end of the latch and that of the upright 11.

It will be apparent from the foregoing that when the hook, with which the latch is provided, is baited, any attempt on the part of an animal to remove the bait therefrom will swing such end of the latch forwardly of the trap, thus disengaging the front end of the trip 22 from the notch 24 in the latch. The trip will then be free to move downwardly toward the base-plate through the tension of the spring 27, carrying with it the inner end of the trip 33, the beveled outer end of which is consequently raised and thus disengaged from the trip 38, when the claw will be at once oscillated on its pivot by reason of its connection with the spring motor 20, the teeth on the plate 16, which forms a part of the claw, piercing the animal and killing him.

The return movement of the claw will cause the forward end of the trip 22 to be elevated, owing to the cable connection between the trip and claw. The inner end of the trip 33 will likewise move upward simultaneously through the action of the spring 36, thus depressing its outer end which engages with the free end of the trip 38, thus retaining the claw in operative position and resetting the trap, such return movement of the claw raising the trip 38 into its vertical position by means of the spring connection 39 between said trip and claw, as will be understood.

The invention further contemplates the provision of means actuated by the claw on its return trip for removing the body of the dead animal. To this end a tilting platform 41 is disposed within a seat 42 formed transversely of the base-plate, directly opposite the cutter plate 21, such platform being pivoted at its outer end upon a rock-shaft 43, journaled in bearings secured to the adjacent side edge of the base-plate. In its normal position, the upper face of the platform is approximately flush with the upper face of the base-plate, and said platform is further provided with a series of fingers 44, which extend transversely across the base-plate. The outer end of the platform is bifurcated adjacent its pivot point, as shown in Fig. 8, and carries at such point a dog 45, normally held in upright position by a spring 46, disposed beneath the under face of the platform. The disposition of the dog 45 with respect to the platform is such that the claw moving toward the cutting plate will rock the dog upon its pivot and pass readily thereover; while upon its return movement the claw will strike against the opposite side of the dog, and since a corresponding rocking movement of the dog is prevented by its contact with a stop 47 formed by the under face of the platform, the contact of the claw with the dog will serve to tilt the platform upwardly upon its rock-shaft, the fingers carried by the platform removing the animal from the base-plate.

Downward movement of the platform below the base-plate is prevented by means of a stop 48, secured to the under face of the base-plate.

The hook end of the latch 25 is preferably partially inclosed by a screen 49, which prevents the animal from reaching the bait without stepping across the platform fingers.

It is to be noted that the oscillation of the claw, which is effected by its crank connection with the motor shaft, serves a double purpose, since on its forward stroke the claw strikes and kills the animal and on its return stroke resets the trap.

Further description of the invention and its various parts is deemed unnecessary in view of the foregoing, it being understood that modifications and changes may be made within the scope of the appended claims, without departing from the spirit of the invention.

What is claimed, is—

1. In an animal trap in combination, a base-plate; an upright mounted upon said base-plate; an oscillatory claw movable horizontally across the base-plate; means for operating said claw; and a cutting plate carried by said upright and adapted to be struck by said claw.

2. In an animal trap in combination, a base-plate; an upright mounted upon said base-plate; an oscillatory claw movable horizontally across the base-plate and pivoted intermediate its ends thereon; and means for oscillating said claw, said means including a rotatably mounted shaft having a crank portion, and a pitman connecting said crank portion with the rear end of said claw.

3. An animal trap comprising in combination, a base-plate having a transverse seat formed therein adjacent its front end; an oscillating claw movable horizontally across the base-plate; means for operating said claw; means for releasably holding said claw against operation by said means; means for releasing said holding means from engagement with said claw; and a tiltable member disposed within said seat and adapted to be operated by said claw during its movement in one direction for removing the body of an animal from the base-plate.

4. An animal trap comprising in combination, a base-plate; a swinging claw pivoted to the base-plate; a latch; trip members engaged with said latch and claw for normally holding the latter in operative position;

means for operating said claw when said trip members are released from engagement with said latch; and a flexible connection between said claw and one of said trip members for reëngaging the latter with said latch upon movement of said claw.

5. An animal trap comprising in combination, a base-plate; an oscillatory claw pivoted to the base-plate and movable thereacross; a latch; a trip member normally engaged with said latch; trip members operatively connected with said claw and first-mentioned trip member and engaged with each other for normally retaining said claw in operative position; means for operating said claw upon disengagement of said first-mentioned trip member from said latch; and a flexible connection between said claw and first-mentioned trip member, for reëngaging the latter with said latch upon movement of said claw in one direction.

6. An animal trap comprising in combination, a base-plate; an oscillatory claw pivoted to the base-plate and movable thereacross; a series of uprights mounted upon the base-plate one in advance of another; a latch pivoted to the forward upright; a forwardly-extending trip lever pivoted to the rear upright and normally engaged with said latch; a trip lever connected with said claw; a trip lever carried by the central upright, said lever being engaged at one end with said last-mentioned trip lever, for normally holding said claw in operative position and connected at its opposite end with said first-mentioned trip lever; means for operating said claw upon disengagement of said latch from said first-mentioned trip lever; and a flexible connection between said claw and said first-mentioned trip lever, for reëngaging the latter with said latch upon movement of said claw in one direction.

7. An animal trap comprising in combination, a base-plate having a transverse seat formed therein adjacent its forward end; an oscillatory claw pivoted to the base-plate and movable thereacross; a latch; a trip member normally engaged with said latch; trip members operatively connected with said claw and first-mentioned trip member and engaged with each other for normally retaining said claw in operative position; means for operating said claw upon disengagement of said first-mentioned trip member from said latch; a tiltable member disposed within said seat and adapted to be operated by said claw during its movement in one direction for removing the body of an animal from the base-plate; and a flexible connection between said claw and first-mentioned trip member for reëngaging the latter with said latch during such movement of said claw.

In testimony whereof, we affix our signatures, in presence of two witnesses.

JACOB B. BRENDT.
CHARLES O. SHERMAN.

Witnesses:
J. J. FENELON,
WALTER KLUDT.